United States Patent [19]
Hetzler

[11] Patent Number: 5,882,156
[45] Date of Patent: Mar. 16, 1999

[54] METHOD AND APPARATUS FOR MILLING A SEGMENT OF A SPHERICAL SURFACE

[76] Inventor: David Hetzler, 110 Hilldale Dr., Chattanooga, Tenn. 37411

[21] Appl. No.: 878,087

[22] Filed: Jun. 18, 1997

[51] Int. Cl.$^6$ ................................................. B23C 1/30
[52] U.S. Cl. .................. 409/132; 29/428; 144/134.1; 409/162; 409/226; 451/272; 451/380
[58] Field of Search .................................... 451/272, 273, 451/278, 279, 380, 387, 392, 393; 144/134.1, 154; 409/132, 162, 172, 226, 228, 199, 229; 269/56, 58; 29/428

[56] References Cited

U.S. PATENT DOCUMENTS

| | | | |
|---|---|---|---|
| 2,587,952 | 3/1952 | Appleby | 451/387 |
| 3,367,375 | 2/1968 | Watson, Jr. | 144/154 |
| 3,469,352 | 9/1969 | Jacon | 451/272 |
| 3,549,439 | 12/1970 | Kaveggia et al. | 451/272 |
| 3,863,395 | 2/1975 | Brown | 451/272 |
| 3,908,722 | 9/1975 | Jacobs | 144/134.1 |
| 3,910,159 | 10/1975 | Galdwin | 409/199 |
| 4,061,077 | 12/1977 | Galdwin | 409/199 |

Primary Examiner—Daniel W. Howell
Assistant Examiner—Adesh Bhargava
Attorney, Agent, or Firm—Alan Ruderman; Miller & Martin

[57] ABSTRACT

A method and apparatus for machining the surface of a spherical segment, the surface being either convex or concave, by a circular milling cutter mounted on a milling machine and rotatably driven about an axis of rotation. The segment is carried by a fixture journally mounted for pivoting about a pivot axis passing through the spherical center of the surface to be cut, and the axis of rotation also passes through the spherical center. The teeth of the cutter lie in a plane perpendicular to the axis of rotation which is the furthest such plane that intersects the face of the cutter so that only the cutting teeth will contact the spherical surface to be formed. The fixture is pivoted about the pivot axis and the segment moves through and is cut by the rotating teeth to form the spherical surface. If the pivot axis of the fixture is on the same side of the machine as the teeth of the cutter, a convex spherical surface is formed, but if the pivot axis of the fixture is on the opposite side of the machine from the teeth of the cutter, a concave spherical surface may be formed.

7 Claims, 4 Drawing Sheets

METHOD AND APPARATUS FOR MILLING A SEGMENT OF A SPHERICAL SURFACE

BACKGROUND OF THE INVENTION

This invention relates to the manufacture of a body having a spherical surface and more particularly to a method and apparatus for milling the surface of a segment of a sphere.

A lapping machine for lapping the spherical surface of certain products such as seal rings, bearings, globe ball valves and other products having spherical surfaces is known in the prior art as being formed by a lap having a plurality of segments each having a spherical surface. These spherical surfaces may be either convex or concave. When the segments are assembled together they form the continuous surface for applying a lap or lapping compound to the surface of the product to obtain an extremely accurate and smooth finished surface. Lapping reduces the wear of parts by providing a very uniform bearing surface.

In the prior art, the common method of machining the spherical segments is by mounting a complete assembly or table of segments together on fixtures mounted on a vertical boring mill equipped with a tracer which causes a single point cutting tool to machine the surface on all the segments together. The fixtures are mounted on a table which rotates about an axis. The cutter moves about the axis of the assembled segments and then moves gradually in step-by-step fashion radially inwardly. This is a relatively slow process since only a small amount of material may be moved during each revolution and several passes are required to complete the process. Additionally, since the assembled lap table of segments may be relatively large, e.g., the spherical surface of the assembly may be in the order of approximately seven feet, the machine for mounting such assemblies is necessarily large and expensive. Accordingly, these factors together with the required assembly set-up time results in a relatively high machining cost per segment and thus the cost of the assembly is reflective thereof.

SUMMARY OF THE INVENTION

Consequently, it is a primary object of the present invention to provide a relatively inexpensive method and apparatus permitting the machining of a spherical surface on individual segments using a conventional machining process and apparatus normally limited to machining flat surfaces.

It is another object of the present invention to provide a true and accurate spherical surface on a single lapping segment using a conventional circular milling cutter with teeth disposed adjacent the periphery and rotatably mounted on a conventional milling machine.

It is a further object of the present invention to provide a method and apparatus for machining spherical surfaces on a lapping segment casting utilizing a milling machine having a circular rotating milling cutter and a fixture for permitting the segment to pivot about the spherical center and through the circle of the cutter, the cutter having an axis of rotation passes through the spherical center.

Accordingly, the present invention provides a method and apparatus for machining the surface of a spherical segment, the segment being one of a plurality of such segments which together comprise a portion or sector of a sphere. The surface may be either convex or concave and in either case is formed by a standard concave type milling cutter having a diameter at least equal to the width of a segment mounted on a milling machine and rotatably driven thereby about an axis of rotation, the segment being carried by a fixture journally mounted for pivoting about a pivot axis passing through the spherical center of the surface to be cut, and the axis of rotation also passing through the spherical center. The teeth of the cutter are at or adjacent to the maximum diameter of the cutter and in a plane normal to the axis of rotation, the plane being that which is the furthest spaced such plane that intersects the face of the cutter and thus the cutter face is either concave or tapered, or in any event hollowed out between the teeth and the axis of rotation of the cutter. Pivoting of the fixture about the pivot axis moves the segment through the rotating teeth of the cutter to form the spherical surface.

When the spherical center point and thus the pivot axis of the fixture are disposed on the same side of the machine as the teeth of the cutter, a convex spherical surface may be formed; but when the spherical center point and pivot axis of the fixture are on the opposite side of the machine from the teeth of the cutter, a concave spherical surface may be formed.

By means of the present invention a conventional milling machine having a conventional circular cutter with teeth disposed at the periphery relative to the axis of rotation may be used to manufacture spherical segments in a single pass of the segment relative to the cutter. Thus, the time and costs for forming the individual segments comprising a spherical sector, such as a spherical lapping surface, is substantially reduced relative to that of the prior art.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENTS

Figure 1:
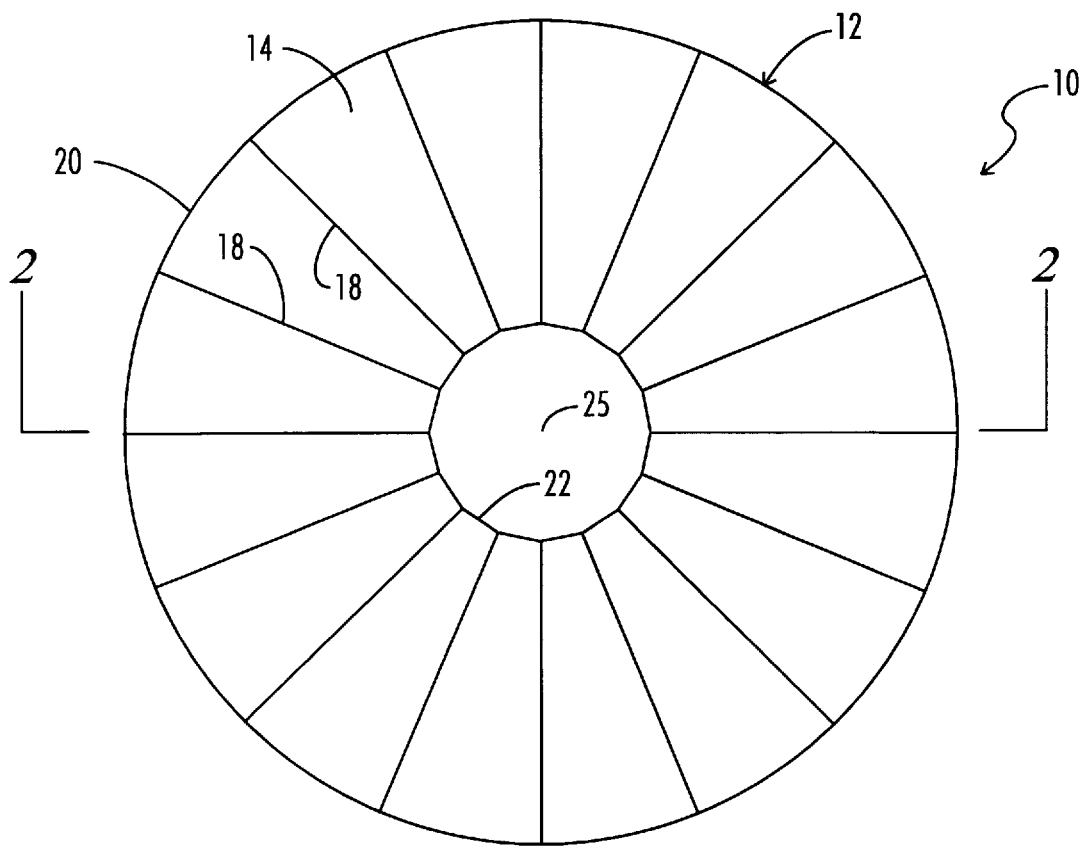
FIG. 1 is a top plan view illustrating an assembly or table of spherical lapping segments each of which may be formed according to the present invention.
Figure 2:
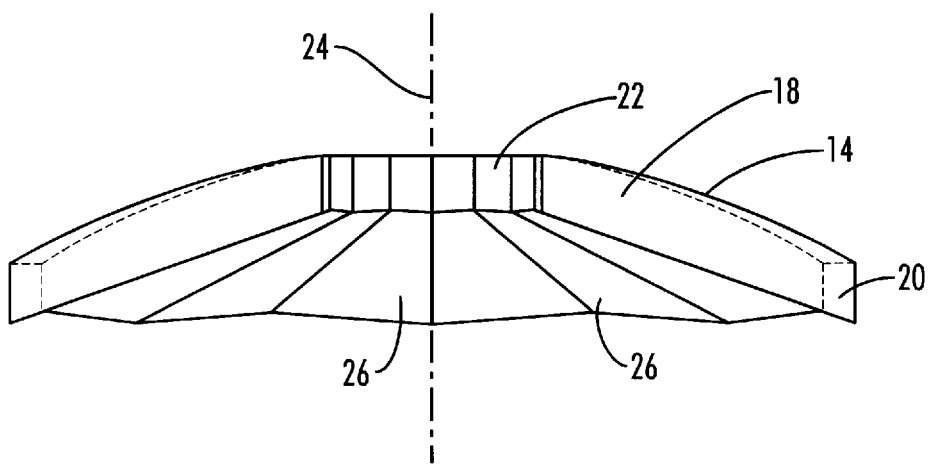
FIG. 2 is a cross sectional view taken substantially along line 2—2 of FIG. 1.

Referring to the drawings, FIGS. 1 and 2 illustrate an assembly 10 of spherical segments 12 forming a sector of a sphere, the sector being defined by a plane through the sphere spaced from a pole and parallel to the arc of the great circle spaced furthest from the pole, the segments being castings of ferrous metal which may be milled according to the method and apparatus of the present invention so that each segment has a respective spherical surface 14. The assembly illustrated has convex spherical surfaces, but as hereinafter described, the method and apparatus of the present invention may be utilized to produce segments having concave spherical surfaces. Although any convenient number of segments may be produced to provide a 360 degree assembly, here, by way of illustration, there are 16 such segments each being 22.5 degrees in plan and thus have sides 18 which extend radially from an arcuate exterior surface 20 at the maximum diameter of the sector to a surface 22 at the minimum diameter spaced from the axis 24 of the sector so as to provide a central opening 25. The spherical sector comprising the segments 12 may thus be mounted on a lapping machine for performing lapping functions with the spherical surfaces acting on the work while the opposite surfaces 26 of the segments face rearwardly or away from the work and may be flat surfaces.

Figure 3:
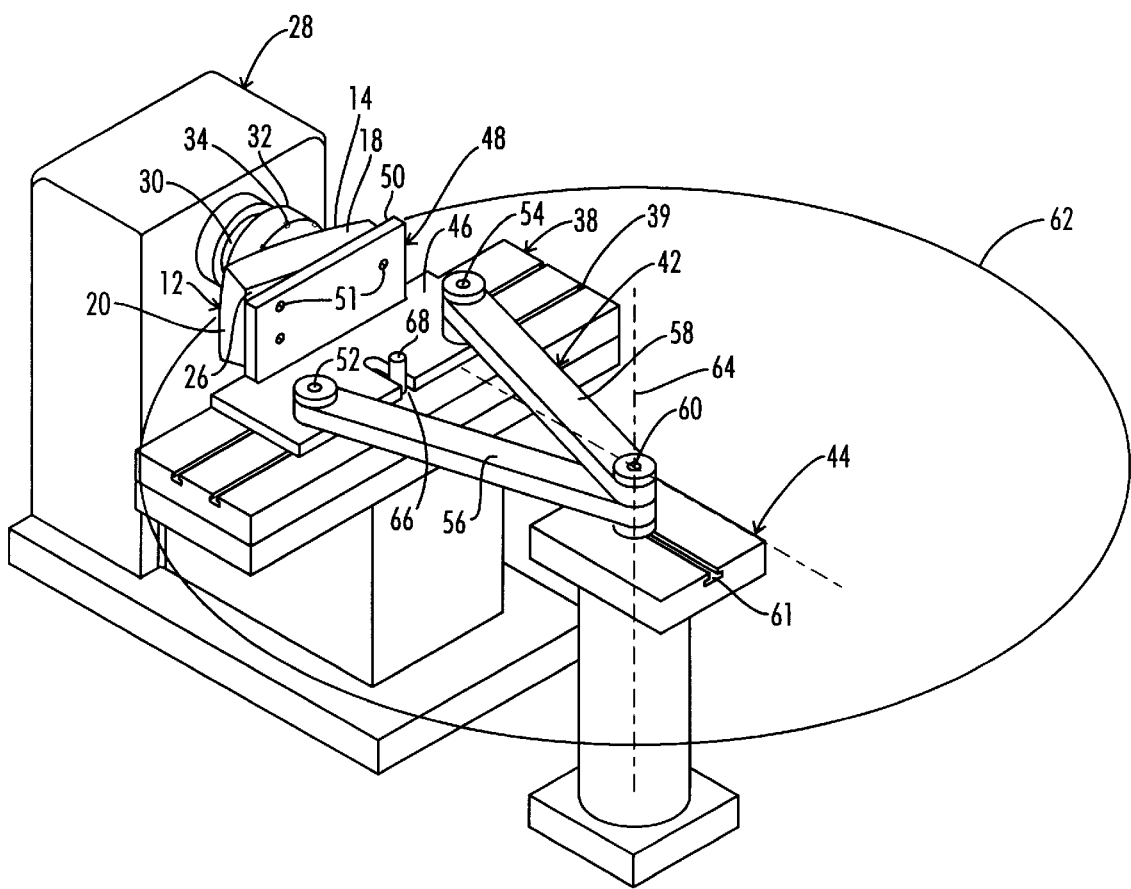
FIG. 3 is a perspective view of apparatus constructed in accordance with the present invention for machining a convex spherical surface on a segment according to the method of the present invention.
Figure 4:
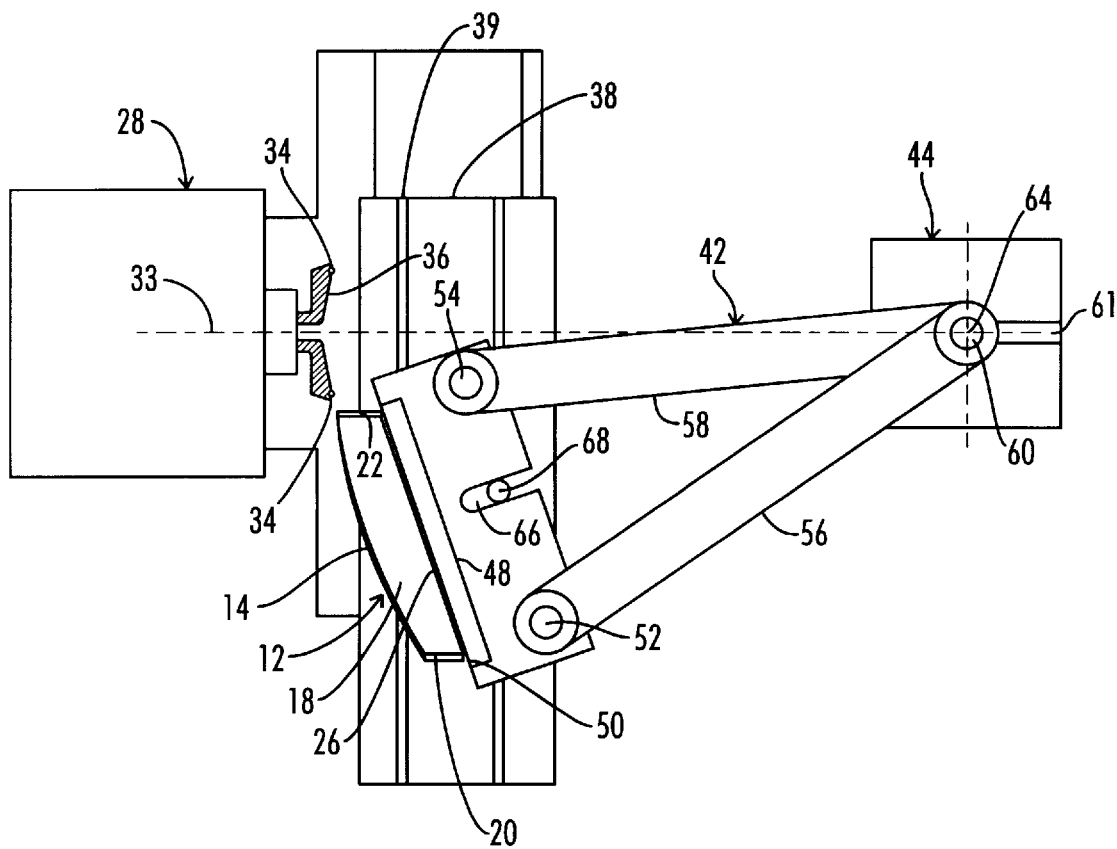
FIG. 4 is a plan view partly in cross section showing a portion of the apparatus illustrated in FIG. 3.

The spherical surface 14 may be machined or shaped according to the present invention by utilizing a conventional milling machine 28 which may be a horizontal milling machine as illustrated in FIG. 3. The milling machine may thus have a horizontal axis rotatable spindle 30 on which a conventional insert type milling cutter 32 is mounted so as to rotate about a horizontal axis 33 as illustrated in FIG. 4. The cutter 32 has a disk shape outer periphery configuration with a face 36 which is concave or tapered radially from the periphery at the maximum diameter to the minimum diameter and includes a plurality of cutting teeth 34 spaced apart equally about the periphery of the face 36. The teeth thus lie in a vertical plane, and that plane is the forwardmost plane that is perpendicular to the axis 33 and that intersects the face 36. Preferably the diameter of the cutter is slightly larger than the width of the segments at the surface 20, i.e., slightly greater than the chord of the arc of a segment so that the cutter may form the spherical surface in only one pass. By having the face 36 concave or tapered from the periphery, the teeth 34 project outwardly furthest relative to the surface of the face or stated another way, the face 36 extends from the teeth 34 toward the axis 33 away from the plane of the teeth which is normal or perpendicular to the axis 33. Thus, when the teeth contact the surface of the body to be machined, no other portion of the cutter face will contact the surface. The milling machine, as is conventional, includes a milling table 38 spaced below and at the same side of the machine as the spindle 30 and elongated transversely of the machine. The table 38 as is conventional includes at least one transversely elongated tee-slot or jig mounting slot 39, and the table may be driven transversely in the direction of the slots.

In accordance with the present invention there is provided a fixture generally indicated at 42 and a positioning table 44. The fixture 42 comprises an elongated platform 46 positioned on the milling machine table 38, the platform being elongated in the same direction as the table 38. A segment holding member 48 is secured to the top of the platform at or adjacent an elongated edge thereof adjacent the milling machine spindle and the cutter 32. The holding member 48 has a planar face 50 facing toward the cutter 32 and the segment 12 to be shaped is secured to the planar face 50 at its surface 26 by means of screws or the like 51, the surface 26, of course, being the surface remote from the surface 14 which is to be spherically shaped. Pivotally connected on journal pins 52, 54 to the top of the platform 46 at spaced apart locations is a respective end of a pair of lever arms 56, 58, the other ends of the arms being pivotally connected by the same journal pin 60 to the top of the positioning table 44. The height of the table 44 and the thickness of the arms 56, 58 are such that in the preferred embodiment the location of the top of the journal pin 60, which may be adjustably positioned along the positioning table within a Tee-shaped slot 61 aligned with the axis of rotation 33 of the cutter 32, is at the spherical center or center of the great circle 62 at the equator of the sphere which the surface 14 of the segment 12 is to conform with. This center, which provides a vertical pivot axis 64 about which the arms 56, 58 may pivot is thus also located along the axis of rotation 33 of the cutter 32 which is therefore perpendicular to the axis 64. The fixture platform 46 and thus the holding member 48 and the segment 12 may thus pivot about the axis 64. To accurately mill the surface 14 then requires merely that the fixture be pivoted to move the segment 12 across the teeth 34 of the cutter 32 from the surface 22 to the surface 20 or vice versa. The platform 46 may include an elongated slot 66 centrally disposed between the journal pins 52, 54 for receiving a stud 68 secured to the milling machine table 38 within one of the Tee-slots 39. Since milling machine tables 38 translate from side to side, by moving the table 38 the pin 68 may push the platform 46 which thereby pivots about the axis 64.

The apparatus illustrated in FIGS. 3 and 4 provides an arcuate true convex spherical surface may be milled onto the face 14 of the segment 12 with a milling cutter 32 having the teeth disposed as aforesaid and illustrated in FIG. 4 when the axis of rotation 33 of the cutter passes through the spherical center point 64 of a sphere having the desired spherical surface. Each point on the circle described by the motion of the rotating cutter teeth is equidistant from the spherical center point. The segment to be machined is then moved in a circular motion determined by the arms 56, 58 pivoting about the pivot axis 64 which, as aforesaid, is also the spherical center point of the desired spherical surface.

Figure 5:
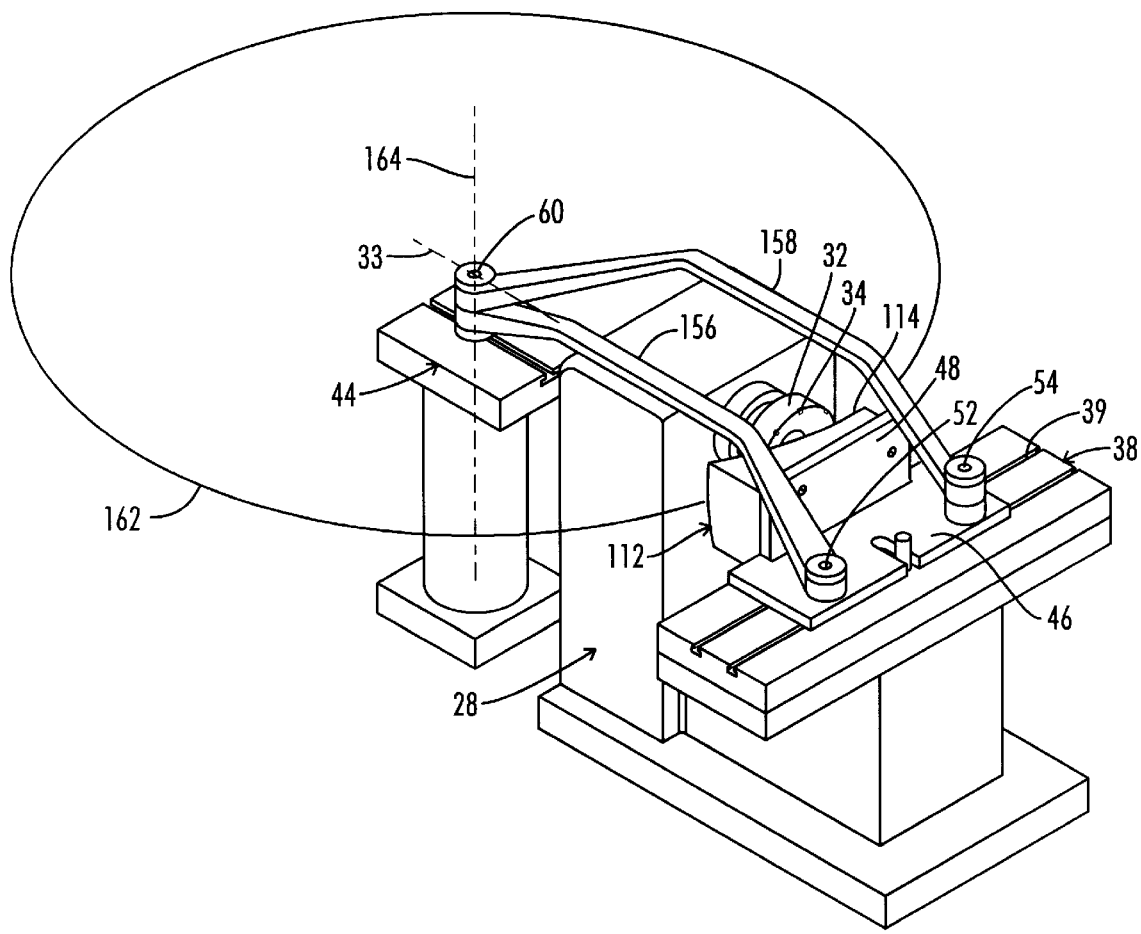
FIG. 5 is a perspective view similar to that illustrated in FIG. 3, but of apparatus for cutting a concave spherical surface according to the method of the present invention.

The cutter teeth thus remove metal which is beyond the spherical radius described thereby. In the case of the convex surface the milling cutter teeth face toward the axis 64. When the cutter faces away from the axis, a concave spherical surface is formed. For example, as illustrated in FIG. 5, a spherical concave face 114 may be machined on a segment 112 by locating the positioning table 44 180 degrees from the location where it was to form the convex spherical configuration. Thus, lever arms 156, 158 must pass from one end of the milling machine to the other end so that the arms are journally mounted on the journal pins 52, 54 on the platform 46 in the same manner as that illustrated in FIG. 3, but the journal pin 60 on the positioning table 44 is located 180 degrees from the direction in which the teeth 34 extend. The axis of rotation 33 of the cutter 32 intersects the axis of rotation 164 which is the center of the great circle 162 at the equator of the sphere of which the surface 114 is to conform. In this manner, as the platform 46 pivotally moves about the axis 164, the teeth 34 cut metal to form the concave spherical surface.

Although the present invention has been described in regard to the best mode contemplated, which is the preferred embodiment, the segments 12 and 112 may be caused to pivot about the respective spherical centers 64, 164 in ways which differ from the actual pivot depicted. The invention may be readily used with such other forms of causing such segments to pivot. For example, a circular groove, concentric with the spherical center to guide the fixture and segment may be utilized as may computerized motion controllers on the milling table to create the motion required.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A method of forming a spherical surface on a metal segment by milling said surface on a milling machine, said method comprising:

providing a circular milling cutter having a central axis and cutting teeth disposed in a plane substantially perpendicular to said axis, said cutter having a face extending from said teeth away from said plane toward axis, mounting said cutter for rotation about said central axis, mounting said segment for movement about a spherical axis corresponding to the center of a great circle of a sphere having a surface corresponding to said spherical surface, said spherical axis intersecting and being perpendicular to said central axis, facing said teeth away from said spherical axis, pivoting said segment about said spherical axis, and rotating said cutter and contacting said surface by said teeth to form a concave spherical surface.

2. A method of forming a spherical surface as recited in claim 1, wherein said segment is secured to a mounting plate and said pivoting of said segment comprises pivoting said mounting plate and thereby said segment about a pivot axis coincident with said spherical axis.

3. A method of forming spherical surfaces as recited in claim 1, wherein the diameter of said circular milling cutter is larger than the width of each segment such that each segment may be cut in a single pass.

4. Apparatus for forming a spherical surface on a metal segment by cutting said surface on a milling machine having a spindle rotatably driven about an axis of rotation and a milling table having an upper planar surface, said apparatus comprising a platform supported on said upper surface of said table for pivotable movement relative to said table about an axis of a great circle of a sphere having a surface corresponding to said spherical surface, a cutter mounted on said spindle for rotation about said axis, said cutter including cutting teeth disposed in a plane substantially perpendicular to said axis, and having a surface extending from said teeth away from said plane toward said axis, means for positioning the axis of said great circle to intersect said axis of rotation at a substantially 90 degree angle, means for mounting said segment on said platform for contact with said teeth, means for pivotally moving said platform about said axis of said great circle, a positioning table spaced from said milling table and disposed at said axis of said great circle, at least one lever arm having one end pivotally journalled on said positioning table for pivoting about said axis of said great circle, said lever arm having a second end pivotally journalled on said platform for guiding said platform to pivot about the axis of said great circle when said platform is moved, and wherein said teeth face away from said positioning table and said axis of said great circle such that said spherical surface is concave.

5. A method of forming a sector of a sphere from a plurality of substantially identical segments each having a spherical surface extending between a pair of spaced apart sides, each side wall extending radially between inner and outer edges, the number of segments being such that the segments may be assembled about a central axis adjacent said inner edge to form said sector, said method including the following steps:

(a) providing a circular milling cutter having an axis of rotation and cutting teeth disposed in a plane substantially perpendicular to said axis of rotation, said cutter having a face extending from said teeth away from said plane toward said axis of rotation, (b) mounting said cutter for rotation about said axis of rotation, (c) mounting a first segment for movement about a spherical axis corresponding to the center of a great circle of a sphere having a surface corresponding to said spherical surface, said spherical axis intersecting and being perpendicular to said central axis, (d) pivoting said segment about said spherical axis, and (e) rotating said cutter and contacting said surface by said teeth; repeating steps c, d and e for each of the remaining segments; and thereafter assembling all of said segments together with the side walls of each segment abutting the side walls of two adjacent segments.

6. A method as recited in claim 5, comprising facing said teeth toward said pivot axis to form a convex spherical surface.

7. A method as recited in claim 5, comprising facing said teeth away from said pivot axis to form a concave spherical surface.

* * * * *